INVENTOR.
MATHIAS RAU
BY
Merchant & Gould
ATTORNEYS

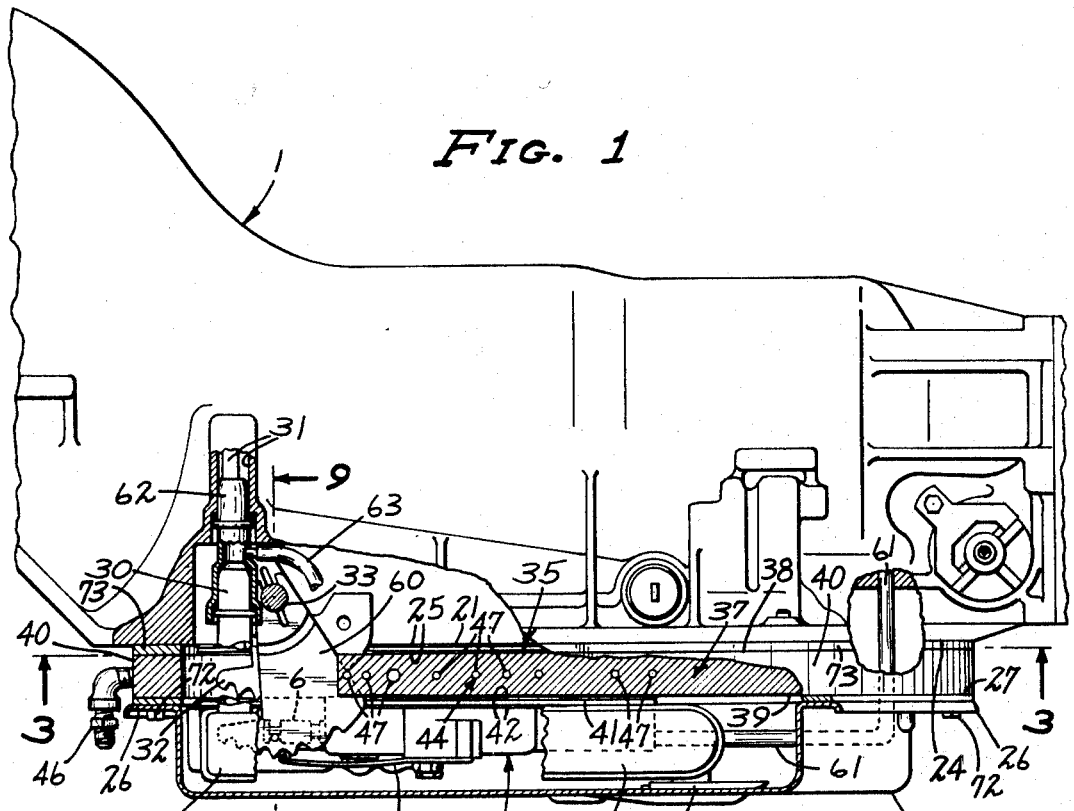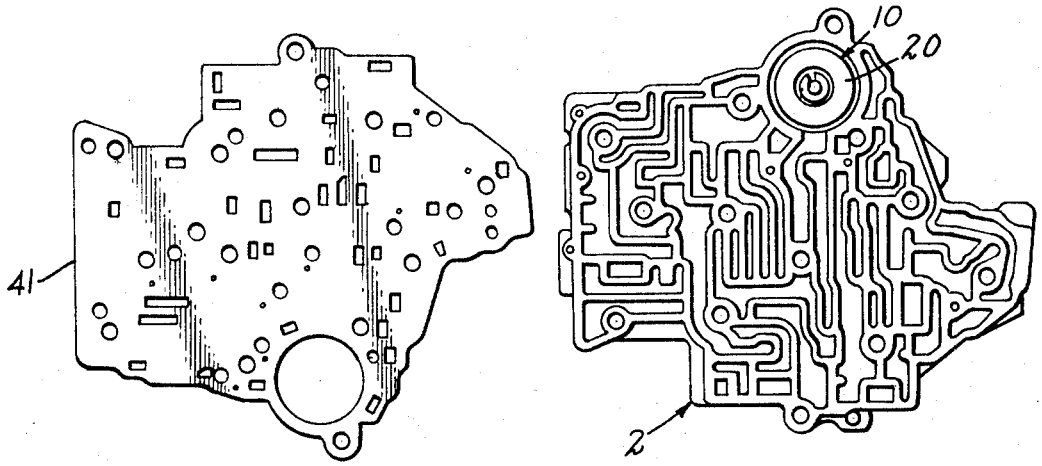

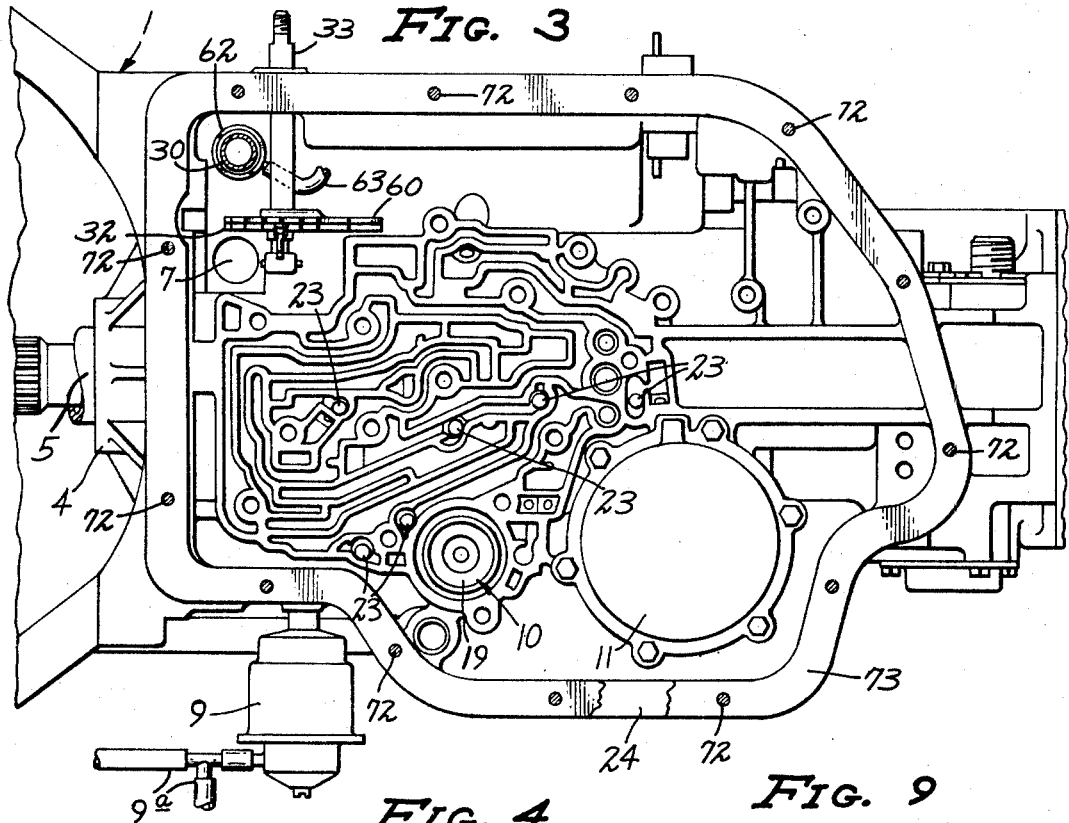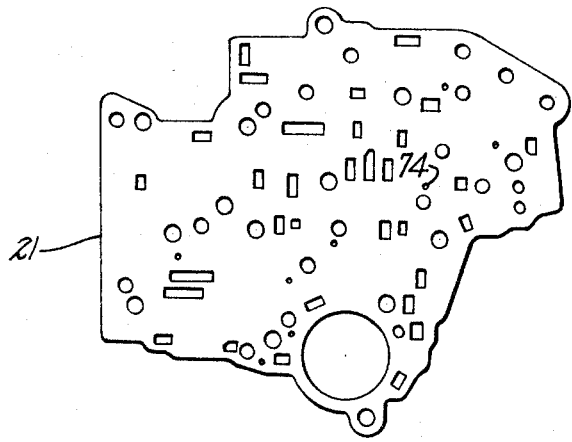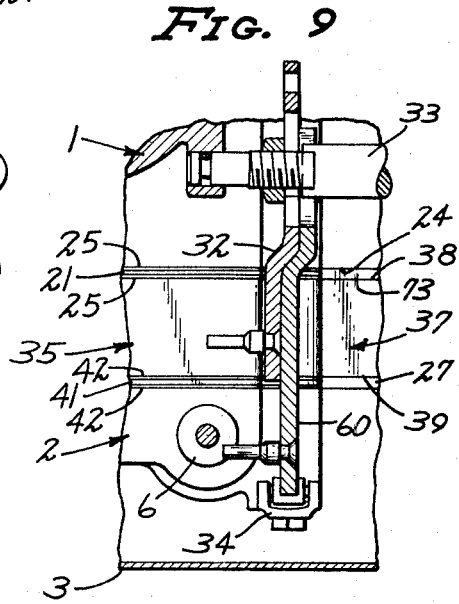

INVENTOR.
MATHIAS RAU
BY
Merchant & Gould
ATTORNEYS

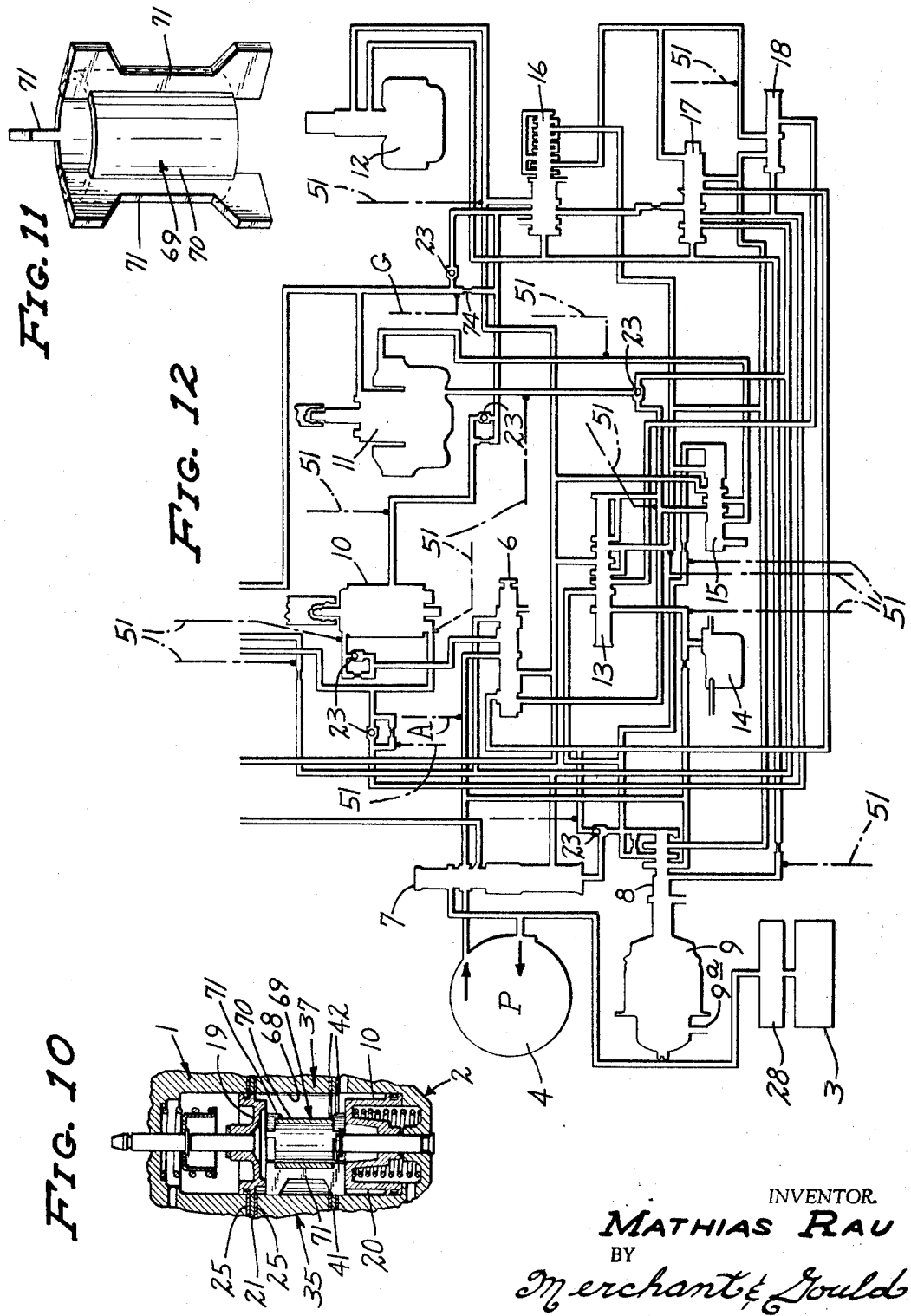

United States Patent Office 3,389,600
Patented June 25, 1968

3,389,600
FLUID PRESSURE TESTING APPARATUS FOR AUTOMATIC VEHICLE TRANSMISSIONS
Mathias Rau, 16340 S. Temple, Minnetonka, Minn. 55343
Filed Apr. 24, 1967, Ser. No. 632,970
8 Claims. (Cl. 73—118)

ABSTRACT OF THE DISCLOSURE

Apparatus for diagnosing malfunctions in automatic transmissions of automotive vehicles, particularly in the hydraulic systems of such transmissions. Insert means mounted between cooperating assemblies having interconnected fluid pasages, provides fluid passage extensions for the interconnected passages, the passages in the insert means having connection with a plurality of gages which indicate operating characteristics of different fluid circuits and fluid pressure control elements of the transmission mechanism.

Background of the invention

Heretofore, the diagnosing and locating of sources of malfunction in hydraulic operated automatic transmissions has been largely by trial and error, often necessitating the disassembly of much of the transmission unit. Often, the cause of malfunction is merely a fragment of foreign matter lodged in a restricted portion of one of the many fluid passages in the unit. The fragment may become dislodged during disassembly and removed, unnoticed by the mechanic, who continues to search for the cause of malfunction, thus unnecessarily wasting time and effort. Moreover, the cause of malfunction of a given operation of the transmission may exist in any one of several component parts or fluid passages in the hydraulic system, and each of these must be checked until the cause is found.

Summary of the invention

The present invention involves plate-like insert means adapted to be interposed between a valve body and the transmission housing of an automatic transmission, the insert means having fluid passages therethrough which form continuation of the normally interconnected fluid passages between the housing and valve body. The insert means contains branch passages leading from given ones of the fluid passages therethrough to ports in the exterior surface portions of the insert means, the ports having means for connection to a plurality of gages which indicate the operating characteristics of the transmission through the different phases of operation thereof. The insert means may be applied to the transmission mechanism without removal of the transmission from the vehicle, and flexible conduit means extending to the various gages permit the gages to be mounted on a panel which may be carried in the vehicle for road testing. Alternatively, the gages may be mounted on a wall or stand adjacent a test rack on which the vehicle may be operated to simulate road travel.

Description of the drawings

Referring to the drawings, in which like reference characters indicate like parts throughout the several views:

FIG. 1 is a fragmentary view in side elevation of an automatic transmission, showing the insert means of my invention applied thereto, some parts being broken away and some parts being shown in section;

FIG. 3 is a view in bottom plan of the transmission housing portion of FIG. 1, as seen substantially from line 3—3 of FIG. 1;

FIG. 4 is a view in bottom plan of a metering plate associated with the transmission of FIG. 1;

FIG. 7 is a view in bottom plan of a metering plate portion of the insert means of this invention;

FIG. 8 is a view in top plan of the valve body portion of the transmission of FIG. 1;

FIG. 9 is an enlarged fragmentary detail in section, taken substantially on the line 9—9 of FIG. 1;

FIG. 10 is an enlarged axial section taken on the line 10—10 of FIG. 2;

FIG. 11 is a view in perspective of a spacer element of this invention;

FIG. 12 is a fluid diagram of the automatic transmission of FIG. 1; and

Figure 2:
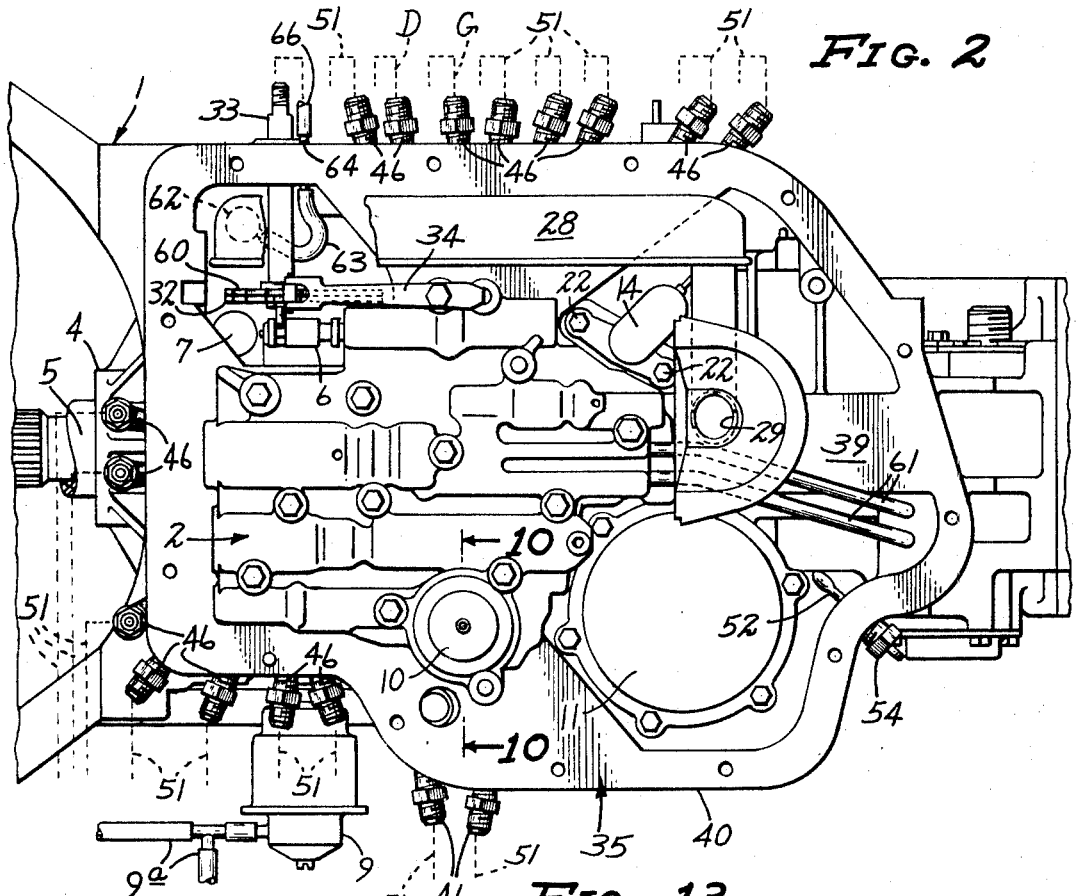
FIG. 2 is a view in bottom plan of the transmission of FIG. 1, with some parts removed.

Bearing in mind that the testing apparatus of this invention is capable of changes in arrangement and design to accommodate various makes of automatic transmissions, for the purpose of the present example, the testing apparatus is shown as applied to a transmission produced by General Motors Corporation under the name "Hydramatic" transmission. This particular transmission mechanism is well-known to those skilled in the transmission art, and includes a transmission housing 1, a valve body 2, an oil pan 3, a pump 4 that is driven by a coupling 5 that is connected to the engine for common rotation therewith through the engine driven pumping element of a fluid coupling or torque converter, not shown. Further, the transmission comprises a system of plate, band and overrunning clutches and planetary gears by means of which the transmission output shaft, not shown, is driven at different forward speed ranges, as well as in reverse rotation. Inasmuch as these mechanism do not comprise the instant invention and are well-known, showing and detailed description thereof is omitted, in the interest of brevity.

Control of the above-mentioned transmission mechanism, to effect operation in the various speed ranges, as well as reverse and neutral dispositions of the transmission, is had through an hydraulic system including the pump 4, a manually operated shifting valve 6, a pressure regulator valve 7, a modulator valve 8 operated by a vacuum modulator 9, front and rear servo mechanisms 10 and 11 respectively, a governor 12, which is driven by the transmission output shaft, not shown, a detent valve 13, a detent solenoid 14, and accumulator valve 15, and fluid pressure operated shift valves 16, 17 and 18, all of which are shown diagrammatically in FIG. 12. The valves 13 and 15–18 are contained in the valve body 2, the valves 7 and 8 being disposed within the transmission housing 1. The vacuum modulator 9, governor 12 and detent solenoid 14 are secured to the housing 1, the rear servo mechanism being mounted in the housing 1. The vacuum modulator 9 is connected to the intake manifolds or carburetor, not shown, by conduits 9a and, through its modulator valve 8, transmits pressure signals to the pressure regulator valve 7 to insure smooth gear shifting in the transmission, at all throttle openings. The governor 12 supplies a vehicle speed signal to the modulator valve 8 to aid in controlling the line pressure in the control system and to vary shift points in the transmission, as is well known. The front servo mechanism housing 1 includes an upper piston, and a lower piston 20 is axially aligned with the upper piston 19 and mounted in the valve body 2, as shown in FIG. 10. The hydraulic control system further includes a metering plate 21, see FIG. 4, that is interposed between the valve body 2 and transmission housing 1, the metering plate 21 having a plurality of openings therein for interconnecting various fluid passages in the housing 1 and valve body 2 and forming restrictions for various ones of said passages. The metering plate 21 is normally secured to the housing 1 by machine screws or the like 22 which mount the detent solenoid 14 to the housing 1, and provide valve seating means for a plurality of check balls 23 in given ones of the passages in the housing 1, see FIG. 3. The housing 1 is formed to provide a flat surface 24 for mounting the metering plate 21 and valve body 2, there being normally a pair of thin gaskets 25 substantially identical in shape and size to the metering plate 21, interposed between the metering plate 21 and the housing 1 and between the metering plate 21 and the valve body 2, the gaskets 25 being shown in FIG. 1. The oil pan 3 is provided with a marginal flange 26 that operatively engages the marginal edge portions of the housing surface 24 through the medium of a gasket 27. An oil filter 28 having an inlet 29 is mounted within the oil pan 3 by means of an outlet tube 30 which is normally mounted in an inlet passage 31 in the housing 1. A notched shifting lever 32 is mounted on a shaft 33 journalled in the housing 1, and engages the shifting valve 6, the lever 32 having notches for engagement with a spring detent 34 mounted on the valve body 2. The shaft is operatively connected to the shifting lever within the driver's compartment of the vehicle, not shown, but in the usual manner.

Figure 5:
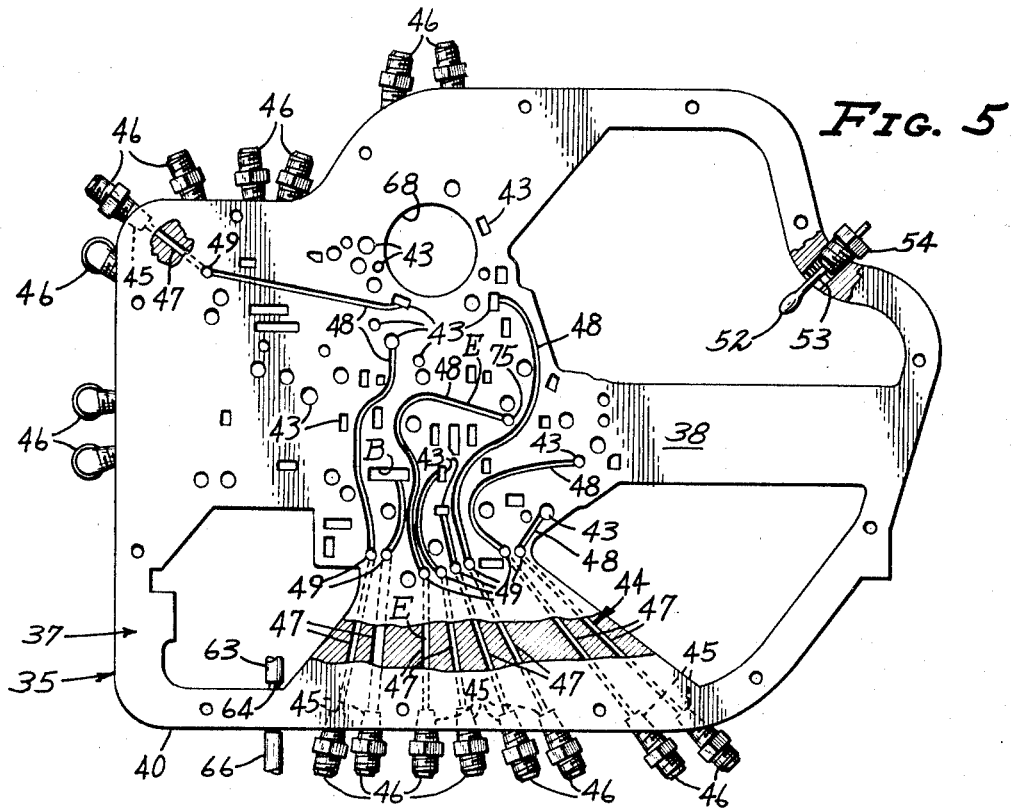
FIG. 5 is a view in top plan of the main body portion of the insert means of this invention, some parts being broken away and some parts being shown in section.
Figure 6:
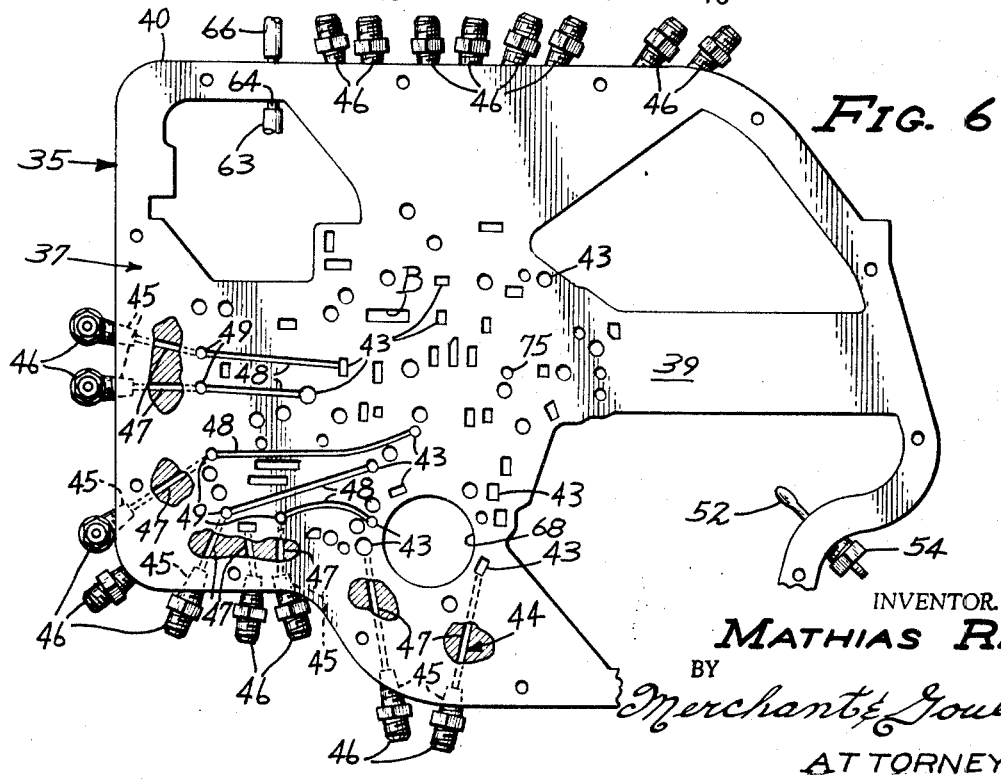
FIG. 6 is a view in bottom plan of the body portion of FIG. 5, some parts being broken away and some parts being shown in section.

The testing apparatus of this invention comprises platelike insert means 35 adapted to be interposed between the transmission housing 1 and the valve body 2, and a plurality of gages operatively connected to the insert means 35 and mounted on a panel or the like 36 which may be mounted on a wall or cabinet or alternatively placed in the driver or passenger compartment of a vehicle for road testing. The insert means 35 includes a relatively thick plate-like main body member 37 having flat parallel inner and outer faces 38 and 39 respectively and a marginal or peripheral surface 40 that corresponds to the outline of the housing surface 24 and flange 26 of the oil pan 3. The insert means 35 further includes a pair of relatively thin metering plates, one of which is shown in FIG. 7 and indicated at 41. The metering plates 41 are substantially identical to the transmission metering plate 21 and, in the embodiment of the invention illustrated, I utilize the transmission metering plate 21 as one of the metering plates of the insert means 35, the inner face 38 of the main body member 37 operatively engaging the metering plate 21 through one of the gaskets 25, the outer face 39 of the main body member 37 operatively engaging one side or face of the metering plate 41 through one of a pair of gaskets 42 substantially identical to the gaskets 25. The main body member 37 is formed to provide passages therethrough between the faces 38 and 39 thereof which passages are aligned with corresponding openings in the transmission metering plate 21, when the insert means 35 is applied to the transmission. Given ones of the passages through the main body member 37 are indicated at 43, each of the passages 43 having branch passages 44 extending laterally therefrom and terminating in ports 45 in the peripheral or marginal surface 40, the ports 45 having conventional conduit fittings 46 screw threaded or otherwise mounted therein. As shown in FIGS. 5 and 6, some of the branch passages 44 extend directly from their respective fluid passages 43 to their respective ports 45 entirely within the main body member 37. Other branch passages 44 include passage portions 47 intermediate the inner and outer faces 38 and 39 and other branch passage portions 48 in the nature of channels in the faces 38 and 39, and drilled holes 49 connecting the channels 48 with their respective internal passage portions 47. The channels 48 are covered by adjacent gaskets 25 and 42 to prevent leakage of fluid from one channel 48 to an adjacent channel. Fluid pressure gages 50, mounted in the panel 36, are connected to respective ones of the fitting 46 by flexible conduits 51, shown by dotted lines in FIGS. 2 and 13, and by broken lines in the diagram of FIG. 12, the conduits 51 being preferably of oil resistant rubber or suitable plastic materials. A conventional temperature sensing element 52 is disposed within an enlarged opening 53 through the main body member 37 and is mounted in the member 37 by a suitable fitting 54, the sensing element 52 being connected to a thermometer gage 55 in the panel 36 by a conductor 56 shown by dotted lines in FIG. 13. A conventional tachometer 57, mounted on the panel 36, is adapted to be connected to the engine ignition distributor in the usual manner, by a conductor 59, shown diagrammatically in FIG. 13.

When it is desired to test an automatic transmission to determine the cause of faulty operation, the oil pan 3 and valve body 2 are dismounted from the transmission housing 1. The shift lever 32 is then moved axially from its keyed position on the shaft 33 and an auxiliary shift lever 60 of greater length than the lever 32 is temporarily mounted on the shaft 33 for engagement with the shifting valve 6 and detent 34. A pair of rigid conduits 61 are mounted in the valve body 2 as replacement for the original conduits, not shown, but which conduct fluid to and from the governor 12, and a tubular extension 62 is mounted on the outlet pipe 30 for reception in the pump inlet passage 31. The tubular extension 62 is connected by a flexible conduit 63 to a fitting 64 in the body member 37. The fitting 64, exterior of the body 37, is connected to a vacuum gage 65 in the panel 36 by a flexible conduit 66.

Figure 13:
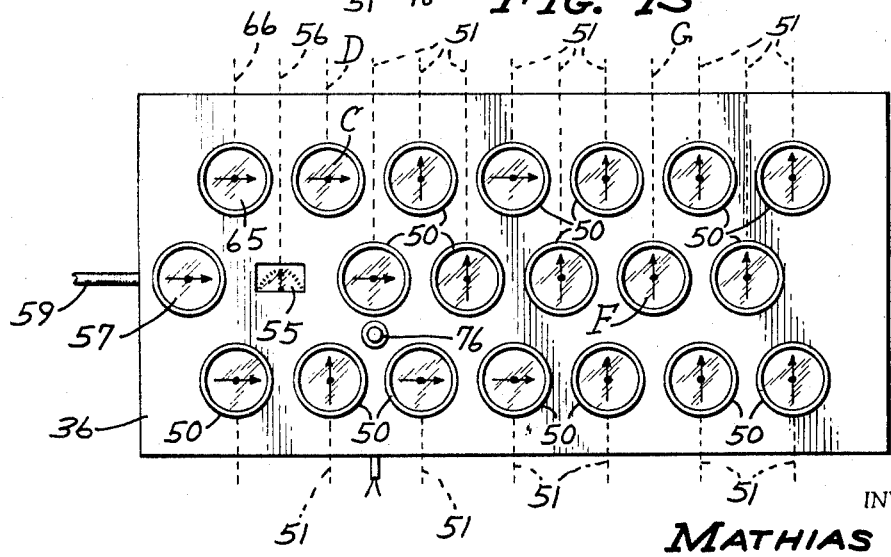
FIG. 13 is a view in front elevation of the panel mounted indicating gages of this invention.

With the oil pan 3 and valve body 2 removed, the main body member 35 and metering plate 41 are applied to the transmission housing 1 with the tubular extension 62 entering the pump inlet passage 31 and the free ends of the conduits 61 inserted into fluid openings 67 in the housing 1, after which the valve body 2 is bolted to the housing 1 with the insert means 35 interposed therebetween. It will be here noted that the main body member 37 is provided with a transverse bore 68 that is aligned with the front servo pistons 19 and 20, the bore 68 having freely axially slidably mounted therein a spacer element 69 comprising a tubular portion 70 and circumferentially spaced radially outwardly projecting spider portions or flanges 71, the opposite ends of the flanges 71 being adapted to engage the servo pistons 19 and 20 and permitting free flow of fluid through the bore 68. The oil pan 3 is then secured to the insert means 35 and housing 1 by machine screws or the like 72. It will be noted, with reference to FIG. 1, that a marginal gasket 73 is interposed between the main body member 37 and the marginal edge portion of the housing surface 24. Assuming that an adequate supply of hydraulic liquid is present in the system, the transmission is operated in the usual manner in the driving of the vehicle and readings of the various gages 50, 55 and 65 are noted. Should any of the gages on the panel 36 give a reading that is not normal for a given operating condition of the transmission, the operator can readily determine the source of trouble in the system. As an example, one of the branch conduits 44, indicated at A in FIGS. 5, 12 and 13, is connected to a passage B in the main body 37 through which hydraulic fluid flows under line pressure from the regulator valve 7 during all phases of operation of the transmission mechanism. The branch passage A is operatively connected to the pressure gage 50 identified at C, by a conduit 51 identified at D. Should the gage C indicate a pressure differing from the normal line pressure, malfunction of the pressure regulator valve 7 is indicated. Should the gage C indicate a lower than normal line pressure and the vacuum gage 65 indicate a higher than normal vacuum or negative pressure, clogging of the strainer or filter 28 is indicated.

It will be noted, with reference to FIG. 4, that some of the apertures in the metering plate 21 are of very small diameter whereby to place a predetermined restriction on the flow of hydraulic fluid in various ones of the fluid passages between the valve body 2 and transmission housing 1. One of these restricted openings is indicated at 74 in FIGS. 4 and 12. One of the branch passages 44, indicated at E at FIG. 5 communicates with a fluid passage 75 in the body member 37 that is in register with the restricted openings 74 in the metering plate 21, the branch passage E being operatively connected to the pressure gage 50 indicated at F, by a conduit G. Fluid under line pressure flows through the restricted openings 74 during several operating phases of the transmission mechanism and, should fragment of foreign matter become lodged in the restricted openings 74, a drop in pressure will be indicated on the gage F.

In addition to the above, drop in pressure shown in the gage F indicates either a fluid leak in the transmission clutch operating fluid system controlled by the servo 11, or a malfunction of the servo 11 or the transmission clutch mechanism controlled by the servo 11. Various ones or combination of the gages 50 are so coupled to the various fluid passages in the control system, that normal function or malfunction of any of the transmission components or control elements, such as the several clutch mechanisms, vacuum modulator, governor, pressure regulator valve, servos, detents and valves, is immediately apparent to the operator.

From the above, it can be seen that, by taking pressure readings from various fluid passages in the hydraulic system during actual operation of the vehicle, the source of trouble can be quickly and accurately pinpointed so that a substantial savings of time and effort is effected in making the necessary repairs. A conventional momentary contact switch 76 is mounted on the panel 36 for connection to the detent solenoid 14 to cause a downshift in the transmission mechanism. The switch 76 is used to determine whether or not the throttle operated downshift switch of the vehicle is operative when the transmission mechanism fails to downshift responsive to full pressure on the throttle.

While I have shown and described a commercial embodiment of my transmission testing apparatus, it will be understood that the same is capable of modification without departure from the spirit and scope of the invention, as defined in the claims.

What is claimed is:

1. Fluid pressure testing apparatus for a hydraulic transmission mechanism having a housing and a valve body attached to the housing, said valve body and housing having communicating fluid passages, therein, said testing apparatus comprising:
   (a) insert means adapted to be interposed between said housing and valve body, said insert means having working faces for operative engagement with said housing and valve body and other surface portions disposed outwardly of the housing and valve body,
   (b) said insert means defining fluid passages therethrough for establishing communication between the fluid passages in said housing and respective passages in said valve body,
   (c) said insert means further defining branch passages leading from given ones of said fluid passages therein and terminating in spaced ports in said other surface portions of the insert means remote from said fluid passages in the insert means for connection to pressure indicating means.

2. The testing apparatus defined in claim 1, characterized by a plurality of pressure gages, and means for operatively connecting each of said gages to a different one of said ports.

3. The testing apparatus defined in claim 2, in which said other surface portions of the insert means define the periphery of said insert means, said means for operatively connecting the gages to said ports comprising a plurality of fittings, each mounted in a different one of said ports, and fluid conduits extending from said fittings to respective ones of said gages.

4. The testing apparatus defined in claim 3, in which said insert means includes a portion laterally outwardly displaced from said valve body, when said insert means is interposed between said valve body and said transmission housing, said displaced portion having an opening therethrough, characterized by a temperature sensing element mounted in said opening, and a thermometer gage operatively connected to said sensing element.

5. The testing apparatus defined in claim 1, in which said insert means comprises a relatively thick main body member and a relatively thin metering plate, said main body member and metering plate each having flat parallel inner and outer faces, the inner faces of said main body member and metering plate being disposed in operative face-to-face engagement, the outer face of said metering plate being disposed for operative face-to-face engagement with said valve body.

6. The testing apparatus defined in claim 5 characterized by a second relatively thin metering plate having flat parallel faces one in operative face-to-face engagement with the outer face of said main body member and the other disposed in operative face-to-face engagement with said transmission housing, said other face of the second metering plate and said outer face of the first mentioned metering plate comprising said working faces of said insert means.

7. The testing apparatus defined in claim 1, in which said working faces are disposed in spaced parallel relationship, and in which said insert means defines a bore extending between said working faces, characterized by a spacer element axially movable in said bore and having an axial length equal to the thickness of said insert means between said working faces thereof.

8. The testing apparatus defined in claim 7, in which said spacer element is formed to provide a passage for free movement of fluid axially of said bore, said spacer element having opposite ends for engagement with cooperating movable elements in said transmission housing and valve body for common movements therewith axially of said bore.

References Cited

UNITED STATES PATENTS

| | | | |
|---|---|---|---|
| 3,145,560 | 8/1964 | Williams | 73—49.7 |
| 3,273,384 | 9/1966 | Flaugher | 73—118 |

DAVID SCHONBERG, *Primary Examiner.*

J. NOLTON, *Assistant Examiner.*